United States Patent
Eda et al.

(10) Patent No.: US 11,769,501 B2
(45) Date of Patent: Sep. 26, 2023

(54) CURIOSITY BASED ACTIVATION AND SEARCH DEPTH

(71) Applicant: INTERNATIONAL BUSINESS MACHINES CORPORATION, Armonk, NY (US)

(72) Inventors: Sasikanth Eda, Vijayawada (IN); Sarbajit K. Rakshit, Kolkata (IN); Abhishek Jain, Baraut (IN); Sandeep Ramesh Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 17/303,552

(22) Filed: Jun. 2, 2021

(65) Prior Publication Data

US 2022/0392443 A1 Dec. 8, 2022

(51) Int. Cl.
*G10L 15/22* (2006.01)
*G10L 15/25* (2013.01)
*G10L 15/18* (2013.01)

(52) U.S. Cl.
CPC .............. *G10L 15/22* (2013.01); *G10L 15/18* (2013.01); *G10L 15/25* (2013.01)

(58) Field of Classification Search
CPC ......... G10L 15/18; G10L 15/22; G10L 15/25; G10L 25/63
See application file for complete search history.

(56) References Cited

U.S. PATENT DOCUMENTS

| | | | |
|---|---|---|---|
| 9,542,941 B1 * | 1/2017 | Weksler | ................... G10L 15/22 |
| 9,548,053 B1 * | 1/2017 | Basye | ..................... G10L 15/22 |
| 10,884,503 B2 | 1/2021 | Divakaran | |
| 2015/0278676 A1 | 10/2015 | Miao | |
| 2017/0092278 A1 | 3/2017 | Evermann | |

(Continued)

FOREIGN PATENT DOCUMENTS

| | | |
|---|---|---|
| CN | 108197115 A | 6/2018 |
| CN | 10221693 A | 9/2019 |

(Continued)

OTHER PUBLICATIONS

International Search Report and The Written Opinion of the International Searching Authority, International application No. PCT/CN2022/092324, dated Aug. 17, 2022, International filing date: May 11, 2022, applicant reference No. EIE220342PCT, pp. 1-10.

(Continued)

*Primary Examiner* — Angela A Armstrong
(74) *Attorney, Agent, or Firm* — Tihon Poltavets

(57) ABSTRACT

Embodiments of the present invention determine a curiosity of a user based on data received from an electronic device associated with the user, where the data includes audible speech captured from user and one or more facial expressions of the user. Embodiments of the present invention identify a first wavelength for audible speech from the user to initiate a command detection mode based on a plurality of wavelengths associated with a user profile for the user. Embodiments of the present invention identify a topic for the audible speech from the user and responsive to determining an intelligent virtual assistant is an intended recipient based on the topic, suspend an activation word for the intelligent virtual assistant.

18 Claims, 6 Drawing Sheets

(56) References Cited

U.S. PATENT DOCUMENTS

| | | | |
|---|---|---|---|
| 2017/0169818 A1* | 6/2017 | VanBlon | G10L 15/222 |
| 2018/0268051 A1 | 9/2018 | Goldstein | |
| 2019/0035394 A1* | 1/2019 | Tsai | G06F 3/167 |
| 2019/0348036 A1 | 11/2019 | Georges | |
| 2019/0371342 A1 | 12/2019 | Tukka | |

FOREIGN PATENT DOCUMENTS

| | | | |
|---|---|---|---|
| WO | 2017076205 A1 | 5/2017 | |
| WO | 2022252951 A1 | 12/2022 | |

OTHER PUBLICATIONS

Baranes et al., "Eye Movements Reveal Epistemic Curiousity in Human Observers", https://www.sciencedirect.com/science/article/pii/S0042698915003430, Science Direct, Vision Research, vol. 117, Dec. 2015, pp. 1-13.

Charlton, "This AI can predict personality just by looking at your eyes", https://www.weforum.org/agenda/2018/08/this-ai-can-predict-your-perso . . . , Aug. 7, 2018, pp. 1-4.

Gottlieb, "Towards a Neuroscience of Active Sampling and Curiosity", https://www.nature.com/articles/s41583-018-0078-0, Nature Reviews Neuroscience 19, 2018, pp. 1-23.

Hoppe et al., "Recognition of curiosity using eye movement analysis", https://dl.acm.org/doi/10.1145/2800835.2800910, Sep. 2015, pp. 1-4.

Klein, "AI can predict your personality just by how your eyes move", New Scientist, https://www.newscientist.com/article/2167850-ai-can-predict-your-perso . . . , May 2, 2018, pp. 1-7.

Mell et al., "The NIST Definition of Cloud Computing", National Institute of Standards and Technology, Special Publication 800-145, Sep. 2011, pp. 1-7.

Neuroscience, "How Curiosity Changes the Brain to enhance Learning", https://neurosciencenews.com/curiosity-memory-learning-neuroscience- . . . , Oct. 2, 2014, pp. 1-9.

\* cited by examiner

CURIOSITY BASED ACTIVATION AND SEARCH DEPTH

BACKGROUND

This disclosure relates generally to intelligent virtual assistants, and in particular to activating and defining search depth for devices employing intelligent virtual assistants based on user curiosity.

An intelligent virtual assistant (IVA) represents a software agent capable of performing various tasks for a user based on verbal commands or questions provided by the user, where the IVA operates on an electronic device. An Internet of Things (IoT) device is an example of an electronic device with an IVA, capable of connecting and exchanging data with other devices and systems via the internet to process any verbal commands or questions. The IVA is typically activated with a word or phrase, where the IVA receives an audible command or query after the word or phrase being spoken by a user. The IVA can receive an activation word and question provided by the user, perform a search to provide an appropriate response to the question, and provide the appropriate response back to the user in the form of an audible response.

SUMMARY

Embodiments in accordance with the present invention disclose a method, computer program product and computer system for user curiosity-based activation and search depth, the method, computer program product and computer system can determine a curiosity of a user based on data received from an electronic device associated with the user, wherein the data includes audible speech captured from user and one or more facial expressions of the user. The method, computer program product and computer system can identify a first wavelength for audible speech from the user to initiate a command detection mode based on a plurality of wavelengths associated with a user profile for the user. The method, computer program product and computer system can identify a topic for the audible speech from the user. The method, computer program product and computer system can, responsive to determining an intelligent virtual assistant is an intended recipient based on the topic, suspend an activation word for the intelligent virtual assistant.

DETAILED DESCRIPTION

Figure 1:
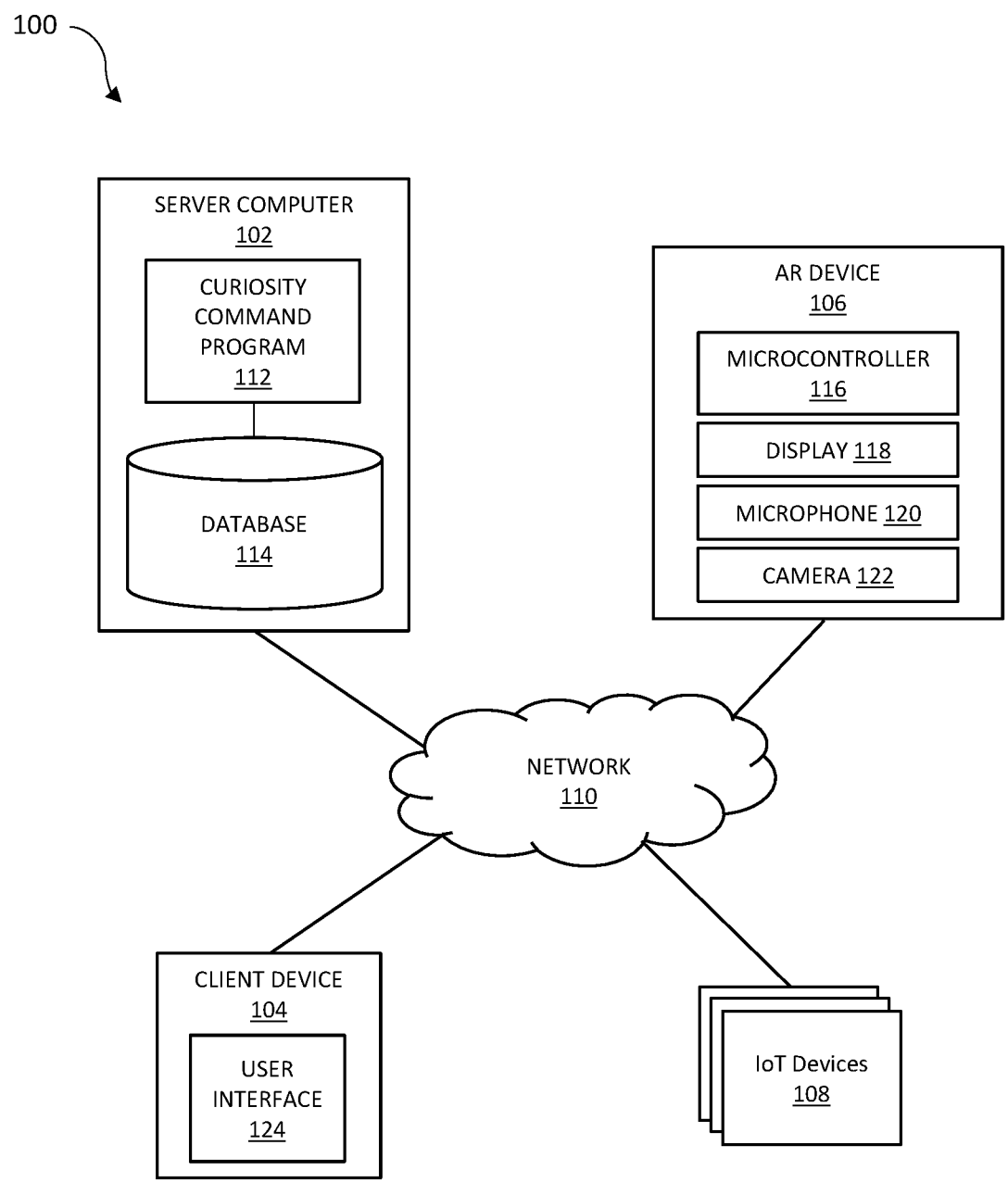
FIG. 1 is a functional block diagram illustrating a distributed data processing environment, in accordance with an embodiment of the present invention.

Embodiments of the present invention provide user curiosity-based activation and search depth for intelligent virtual assistants. A framework observes wavelength of audible speech of a user interacting with an intelligent virtual assistant and stores the observed wavelengths in a profile associated with the user. The profile associated with the user is updatable based on learning that occurs from subsequent commands and questions presented to the intelligent virtual assistant. The framework also observes wavelength modulation of the user when asking a question, seeking clarification, and when a question is presented by user to a recipient versus the intelligent virtual assistant. Based on the framework, embodiments of the proposed invention can determine curiosity of the user and utilizing a wavelength for the audible speech of the user, determine whether an intelligent virtual assistant is an intended recipient of a question.

Embodiments of the present invention identify curiosity of the user based on a line of sight of the user, speech pattern identification, eye movements, and historical patterns. Utilizing historical learning, a curiosity command program predicts user curiosity relating to a topic based on data from an electronic device associated with the user and can activate the intelligent virtual assistant, bypassing an activation word or phrase for the intelligent virtual assistant. The curiosity prediction program predicts the curiosity of the user and sends an alert to electronic device (e.g., smart contact lens) associated with the user regarding audible speech with a command performable by the intelligent virtual assistant, where the activation word or phrase is bypassed. The alert notifies the user that curiosity has been detected for the user and the audible speech includes a command performable by the intelligent virtual assistant. The user can select, via the electronic device (e.g., a first eye motion) to activate the intelligent virtual assistant by sending the performable command to the intelligent virtual assistant or the user can select, via the electronic device (e.g., a second motion) to ignore the performable command. The curiosity prediction program utilizes historical learning to determine a level of curiosity from the user to activate the intelligent virtual assistant, while bypassing the activation word or phrase. In a multi-user environment (e.g., office setting), if each has an associated electronic device, the curiosity prediction program can interact with each of the multiple users via the associated electronic device, while providing responses for the performable command from the intelligent virtual assistants in the respective associated electronic device.

Embodiments of the present invention can determine and modify a search depth for a command provided by a user. The curiosity prediction program can determine the user is expressing curiosity and determine a grade of curiosity for the user. Based on the grade of curiosity for the user and a command from the user, the curiosity command program determines a search depth score and sends the search depth score and command to a backend search engine associated with the intelligent virtual assistant. The curiosity command program can provide a response time to the user for the command and receive a modified search depth score from the user to adjust how the intelligent virtual assistant processes the command utilizing the backend search engine.

Embodiments of the present invention can determine and manage a knowledge base for performing a search on a command provided by a user. The curiosity command program can analyze the command from the user and determine at least two knowledge bases (e.g., sports, science, engineering, history) for the command. The curiosity command program can send the at least two knowledge bases for the command and the command to the backend search engine. In the event the curiosity command program determines parallelization is supported where the at least two knowledge bases are determined, the curiosity command program parallelizes the search with the at least two knowledge bases. In the event the curiosity command program determines parallelization is not supported, the curiosity command program loads a first knowledge base and responsive to receiving a result from the backend search engine associated with intelligent virtual assistant for the first knowledge base, sending the result to a second knowledge base.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment includes server computer 102, client device 104, augmented reality (AR) device 106, and Internet of Things (IoT) devices 108 all interconnected over network 110. Server computer 102 can be a standalone computing device, a management server, a web server, a mobile computing device, or any other electronic device or computing system capable of receiving, sending, and processing data. In other embodiments, server computer 102 can represent a server computing system utilizing multiple computers as a server system, such as in a cloud computing environment. In another embodiment, server computer 102 can be a laptop computer, a tablet computer, a netbook computer, a personal computer (PC), a desktop computer, a smart phone, or any programmable electronic device capable of communicating with client device 104, AR device 106, IoT devices 108, and other computing devices (not shown) within the distributed data processing environment via network 110. In another embodiment, server computer 102 represents a computing system utilizing clustered computers and components (e.g., database server computers, application server computers, etc.) that act as a single pool of seamless resources when accessed within the distributed data processing environment. Server computer 102 includes curiosity command program 112 and database 114. Server computer 102 may include internal and external hardware components, as depicted and described in further detail with respect to FIG. 5.

Client device 104 can be a laptop computer, a tablet computer, a smart phone, smart watch, a smart speaker, or any programmable electronic device capable of communicating with various components and devices within the distributed data processing environment (e.g., server computer 102, AR device 106, and IoT devices 108), via network 110. Client device 104 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In general, client device 104 represents one or more programmable electronic devices or combination of programmable electronic devices capable of executing machine readable program instructions and communicating with other computing devices (not shown) within the distributed data processing environment via a network, such as network 110. In one embodiment, client device 104 represents one or more devices associated with a user. Client device 104 includes an instance of user interface 124 for interacting with curiosity command program 112 on server computer 102.

AR device 106 represent user wearable augment reality device (e.g., electronic contact lens, wearable electronic headset) with integrated microcircuitry capable of displaying content to the user. AR device 106 includes microcontroller 116, display 118, microphone 120, and camera 122, where curiosity command program 112 can receive audible speech from a user wearing AR device 106 for potential execution by one or more intelligent virtual assistants operating on IoT devices 108. Microcontroller 116 can include a display control circuit for display 118, a communication and power conversion circuit for communicating via network 110 and managing an integrated power supply, and a sensor readout and control circuit for monitoring eye movement of the user wearing AR device 106. Display 118 allows for a user of AR device 106 to view various notifications and queries from curiosity command program 112. In an example where AR device 106 is an electronic contact lens, display 118 is a semitransparent display and microlens array integrated into AR device 106 for viewing content. AR device 106 can also include a power storage module, a solar cell module for charging the power storage module, a biosensor module for collecting data (e.g., tracking eye movement), and a communications and power module for communicating with server computer 102, client device 104, and IoT devices 108 via network 110. Microphone 120 captures audible speech from the user and microcontroller 116 transmits the captured audible speech to curiosity command program 112 on server computer 102. AR device 106 also includes camera 122 for capturing a facial response when a user is providing the audible speech capturable by microphone 120.

IoT devices 108 represent an electronic device connected to network 110 capable of receiving and executing a voice command provided by a user of client device 104 and/or AR device 106. Each IoT device 108 includes an instance of an intelligent virtual assistant (IVA) representing a software agent capable of performing various tasks for a user based on commands or questions provided by the user. IoT devices 108 can include but not limited to appliances, home security systems, health monitoring devices, factory equipment, wireless inventory trackers, biometric security scanners, and any other electronic device embedded with sensors and software for connecting and exchanging data with other devices and systems over the internet (e.g., network 110).

Network 110 can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include voice, data, and video information. In general, network 110 can be any combination of connections and protocols that will support communications between server computer 102, client device 104, AR device 106, IoT devices 108, and other computing devices (not shown) within the distributed data processing environment.

For activating an IVA operating on IoT device 108 based on a curiosity of a user, curiosity command program 112 determines curiosity of a user within a vicinity of IoT device 108, where the user is associated with client device 104 and/or AR device 106. AR device 106 captures various data through microphone 120 and camera 122 and subsequent to curiosity command program 112 receiving the various data, curiosity command program 112 determines the user is expressing curiosity or a curious sentiment. Curiosity command program 112 identifies a voice wavelength in audible speech of the user to initiate a command detection mode, where the voice wavelength is associated with expressed curiosity or curious sentiment of the user. Curiosity command program 112 identifies a topic for the audible speech from the user and determines an intended recipient of the audible speech from the user. In the event curiosity command program 112 determines the audible speech is not directed to the IVA operating on IoT device 108, curiosity command program 112 ignores the audible speech. In the event curiosity command program 112 determines the audible speech is directed to an IVA operating on IoT device 108, curiosity command program 112 suspends the activation word for the IVA operating on IoT devices 108. Curiosity command program 112 can send the audible speech to the IVA operating on IoT device 108, instruct the IVA operating on IoT device 108 to listen for the audible speech from the user, and/or instruct the user to repeat the audible speech so it can be captured by the IVA operating on IoT device 108.

For determining and modifying a search depth for a command provided by a user, curiosity command program 112 determines the user is expressing curiosity and determines a grade of curiosity for the user. Based on the grade of curiosity for the user and a command from the user, curiosity command program 112 determines a search depth score and sends the search depth score and command to a backend search engine. Curiosity command program 112 provides a response time to the user for the command and receives a modified search depth score from the user to adjust how the IVA operating on IoT device 108 processes the command utilizing the backend search engine.

For determining and managing a knowledge base for performing a search on a command provided by a user, curiosity command program 112 analyzes the command from the user and determines a knowledge base for the command. Curiosity command program 112 sends the knowledge base for the command and the command to the backend search engine. In the event curiosity command program 112 determines parallelization is supported, curiosity command program 112 parallelizes the search with the two knowledge bases. In the event curiosity command program 112 determines parallelization is not supported, curiosity command program 112 loads a first knowledge base and responsive to receiving a result from the first knowledge base, sending the result to a second knowledge base.

Database 114 stores various data utilized by curiosity command program 112 including but not limited to user profiles, curiosity voice wavelengths for each user, search depth scores for each user, and various knowledge bases for associating with a searchable command. In the depicted embodiment, database 114 resides on server computer 102. In another embodiment, database 114 may reside on client device 104 or elsewhere within the distributed data processing environment provided curiosity command program 112 has access to database 114. A database is an organized collection of data, where database 114 can be implemented with any type of storage device capable of storing data and configuration files that can be accessed and utilized by curiosity command program 112, such as a database server, a hard disk drive, or a flash memory.

User interface 124 enables a user to make requests of or issue commands to server computer 102, client device 104, AR device 106, and IoT devices 108 via network 110. User interface 124 also enables the user to receive information and instructions in response on client device 104 via network 110. In one embodiment, a user of client device 104 accesses user interface 124 via voice commands in natural language. In one embodiment, user interface 124 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 124 enables a user of client device 104 to interact with curiosity command program 112 operating on server computer 102.

Figure 2:
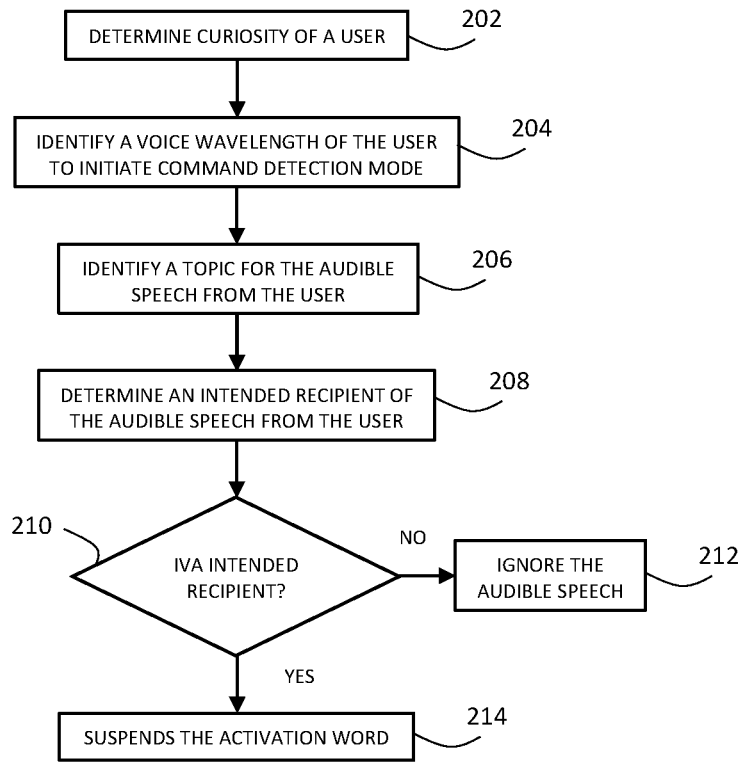
FIG. 2 depicts a flowchart for a curiosity command program activating an intelligent virtual assistant based on a curiosity of a user, in accordance with an embodiment of the present invention.

FIG. 2 depicts a flowchart for a curiosity command program activating an intelligent virtual assistant based on a curiosity of a user, in accordance with an embodiment of the present invention.

Curiosity command program 112 allows for the activation of an IVA operating on an electronic device (e.g., IoT device) based on a curiosity of a user, rather than the user utilizing an activation word and/or phrase for the IVA to listen to audible speech of the user. Curiosity command program 112 can establish a profile for each user of the IVA operating on the electronic device, where each profile includes wavelength information for audible speech from the user when directing a question to the IVA. In one embodiment, an IVA operates on an electronic device positioned in a personal residence, where curiosity command program 112 establishes a profile for each individual (i.e., user) residing at the personal residence. In another embodiment, an IVA operates on an electronic device positioned in an office, where curiosity command program 112 establishes a profile for each employee (i.e., user) of the office. Curiosity command program 112 utilizes the profile for each user to establish a framework for determining curiosity of the user by monitoring wavelengths for audible speech by the user when utilizing an activation word and/or phrase for the IVA to listen to audible speech of the user. Curiosity command program 112 identifies whether the audible speech includes a command or a question and identifies wavelengths for the audible speech by the user when a question is presented to the IVA. Curiosity command program 112 associates the identified wavelengths for the audible speech with the question presented to the IVA, with the profile for the user.

Furthermore, curiosity command program 112 can instruct the IVA operating on the electronic device to perform a wavelength clarification test. Curiosity command program 112 can send a list of sample questions to the IVA and can instruct the IVA to request the user repeat the list of sample questions, where the list of sample questions do not relate to a command or question performable by the IVA. For example, the questions can include, "Did you go into the office on Friday?", "How was the show you saw on Saturday?", "What did you do this weekend?", and "What happened during yesterday's meeting?". As the user repeats the list of questions, curiosity command program 112 identifies wavelengths for the audible speech by the user when question is not presented to IVA but rather to another recipient. Curiosity command program 112 associates the identified wavelengths for the audible speech with the question not presented to the IVA but rather to another recipient, with the profile for the user. As a result, curiosity command program 112 creates a profile for the user that includes a first set of wavelengths for audible speech with the question presented to the IVA and a second set of wavelengths for audible speech with the question not presented to the IVA but rather to another recipient.

Curiosity command program 112 determines a curiosity of a user (202). Curiosity command program 112 utilizes an electronic device associated with the user, such as a client device or augmented reality (AR) device, to receive various data for the user who is engaging in a conversation. The various data include audible speech captured by the user and one or more facial expressions of the user captured by a camera. Curiosity command program 112 can utilize the various data for the user to determine if a user is expressing curiosity, where curiosity can be in the form of a question presented in the audible speech of the user or voice module for one or more words in the audible speech of the user. Curiosity command program 112 can also utilize the various data for the user to determine if a user is expressing curiosity, where curiosity is presented in the form of one or more facial expressions by the user, such as, raised eyebrows, rapid blinking of the eyes, and head tilt. Based on the various data from the electronic device associated with the user, curiosity command program 112 determines whether the user is curious.

Curiosity command program 112 identifies a voice wavelength of the user to initiate command detection mode (204). As mentioned above, curiosity command program 112 receives various data from the electronic device associated with the user, where the various data includes audible speech captured by the user. Based on the audible speech that resulted in curiosity command program 112 determining curiosity of the user, curiosity command program 112 identifies a voice wavelength for the user to initiate a command detection mode. The command detection mode represents curiosity command program 112 identifying a question (i.e., command) in the audible speech of the user based on the first set and the second set of wavelengths stored for the user with the user profile.

Curiosity command program 112 identifies a topic for the audible speech from the user (206). In this embodiment, curiosity command program 112 identifies the topic for the audible speech from the user based on the identified question in the audible speech. In another embodiment, curiosity command program 112 identifies the topic for the audible speech from the user based on all the audible speech that resulted in the curiosity command program 112 determining curiosity of the user. In one example, the audible speech captured by the electronic device includes, "Hey Bob, what did I miss during the meeting this morning?". Curiosity command program 112 identifies the topic as a "meeting" with an association with a particular recipient (i.e., Bob). In another example, the audible speech captured by the electronic device includes, "If we are still going to the baseball game, hopefully it doesn't rain." Curiosity command program 112 identifies the topic as "baseball game" with an association with a particular variable and not a particular recipient. In this example, curiosity command program 112 identifies the particular variable as "rain" and "rain" is associated with a general variable "weather".

Curiosity command program 112 determines an intended recipient of the audible speech from the user (208). In this embodiment, curiosity command program 112 determines the intended recipient of the audible speech from the user based on the topic for the audible speech. From the previous example, where curiosity command program 112 identifies the topic as a "meeting" with an association with a particular recipient, curiosity command program 112 determines the recipient is "Bob" since the user audibly mentioned the recipient's name. Curiosity command program 112 can also verify the recipient by determining whether another electronic device associated with the recipient (i.e., Bob) is in a vicinity (e.g., 10-foot radius) of the user with the electronic device that captured the audible speech. If the other electronic device associated with the recipient is within the vicinity of the user with the electronic device that captured the audible speech, curiosity command program 112 confirms the recipient of the audible speech from the user (i.e., Bob). From another previous example, where curiosity command program 112 identifies the topic as "baseball game" with an association with a particular variable and not a particular recipient, curiosity command program 112 determines whether the audible speech from the user can be directed to the IVA, where the IVA is the intended recipient. Curiosity command program 112 analyzes the topic (i.e., baseball game) and the particular variable (i.e., weather) and determines if an IVA can resolve the curiosity of the user. If the IVA can resolve the curiosity of the user based on the analyzing of the topic and the particular variable, curiosity command program 112 determines the intended recipient of the audible speech from the user is the IVA.

Curiosity command program 112 determines whether the intelligent virtual assistant (IVA) is the intended recipient of the audible speech from the user (decision 210). In the event curiosity command program 112 determines the IVA is not the intended recipient of the audible speech from the user ("no" branch, decision 210), curiosity command program 112 ignores the audible speech (212). In the event curiosity command program 112 determines the IVA is the intended recipient of the audible speech from the user ("yes" branch, decision 210), curiosity command program 112 suspends the activation word (214). By suspending the activation word, curiosity command program 112 can send the audible speech to the IVA for processing and performing a backend search on the question presented in the audible speech from the user. Alternatively, curiosity command program 112 can generate a question based on the audible speech from the user. In the example where the audible speech captured by the electronic device includes, "If we are still going to the baseball game tonight, hopefully it doesn't rain", curiosity command program 112 generates a question for the IVA of "What is the weather tonight?".

Figure 3:
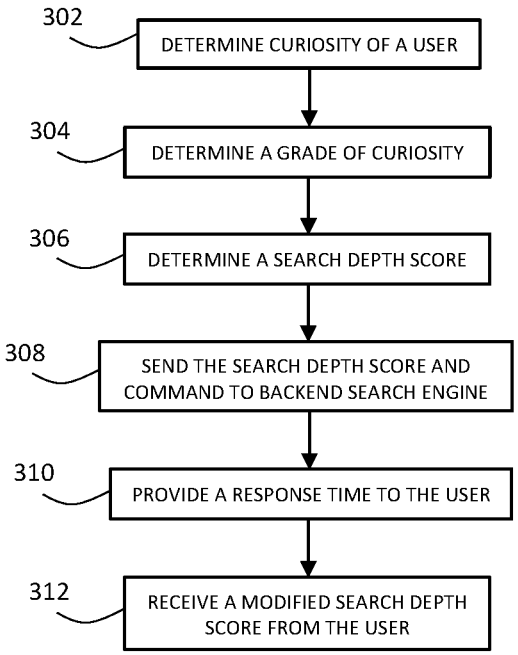
FIG. 3 depicts a flowchart for a curiosity command program determining and modifying a search depth for a command provided by a user, in accordance with an embodiment of the present invention.

FIG. 3 depicts a flowchart for a curiosity command program determining and modifying a search depth for a command provided by a user, in accordance with an embodiment of the present invention.

Curiosity command program 112 determines a curiosity of a user (302). As previously discussed, curiosity command program 112 utilizes an electronic device associated with the user, such as a client device or augmented reality (AR) device, to receive various data for the user who is engaging in a conversation. The various data include audible speech captured by the user and one or more facial expressions of the user captured by a camera. Curiosity command program 112 can utilize the various data for the user to determine if a user is expressing curiosity, where curiosity can be in the form of a question presented in the audible speech of the user or voice module for one or more words in the audible speech of the user. Curiosity command program 112 can also utilize the various data for the user to determine if a user is expressing curiosity, where curiosity is presented in the form of one or more facial expressions by the user, such as, raised eyebrows, rapid blinking of the eyes, and head tilt. Based on the various data from the electronic device associated with the user, curiosity command program 112 determines whether the user is curious.

Curiosity command program 112 determines a grade of curiosity (304). Curiosity command program 112 determines the grade of curiosity with respect to the various data for the user engaging in conversation. For the audible speech captured by the user, curiosity command program 112 identifies modulations in the voice of the user or keyword in the audible speech that would indicate a grade of curiosity for the user. In one example, the audible speech that curiosity command program 112 receives includes, "That's interesting that the stock ABC is up today. I wonder what the Q1 results must have been outstanding". Based on the audible speech, curiosity command program 112 determines a high grade of curiosity based on keywords in the audible speech that includes "interesting", "wonder", and "outstanding". In another example, the audible speech that curiosity command program 112 receives includes, "Doesn't matter much but we'll probably be driving in the rain." Based on the audible speech, curiosity command program 112 determines a low grade of curiosity based on keywords in the audible speech that includes "doesn't matter much". For one or more facial expressions of the user captured by a camera, curiosity command program 112 determines a grade of curiosity based on an extent of the one or more facial expressions of the user. Curiosity command program 112 can determine a final grade of curiosity for the user across the various data if both the audible speech captured by the user and the one or more facial expressions are provided.

Curiosity command program 112 determines a search depth score (306). Curiosity command program 112 determines a search depth score based on a user defined level of response for a searchable command and the grade of curiosity. The user defined level of response is based on a scale of how information and/or detail the IVA is to provide when performing a search on the searchable command, while also considering the grade of curiosity. The user defined levels of response can be associated with various topics, where curiosity command program 112 identifies various topics as previously discussed with regards to (206) in FIG. 2. A low search depth score is based on low level of response as defined by a user and can include searchable commands relating to the topics of weather, traffic, and entertainment. A high search depth score is based on a high level of response as defined by a user and can include searchable commands relating to professional and educational topics, where the user requires a detailed response from the IVA.

Curiosity command program 112 sends the search depth score and the command to a backend search engine (308). Curiosity command program 112 send the search depth score and the performable command to the IVA, where the IVA utilizes the backend search engine to obtain a response to the performable command. Curiosity command program 112 provides a response time to the user (310). Curiosity command program 112 provides a response time to the user based on a current search depth score (i.e., the determined search depth score) by displaying the response time to the user in a user interface on a client device and/or in an AR device, associated with the user. Curiosity command program 112 receives a modified search depth score from the user (312). Curiosity command program 112 allows for the user to modify the search depth score to adjust the response time. For example, decreasing the search depth score can increase the response time and increasing the search depth score can decrease the response time, of the IVA providing a response to the performable command.

Figure 4:
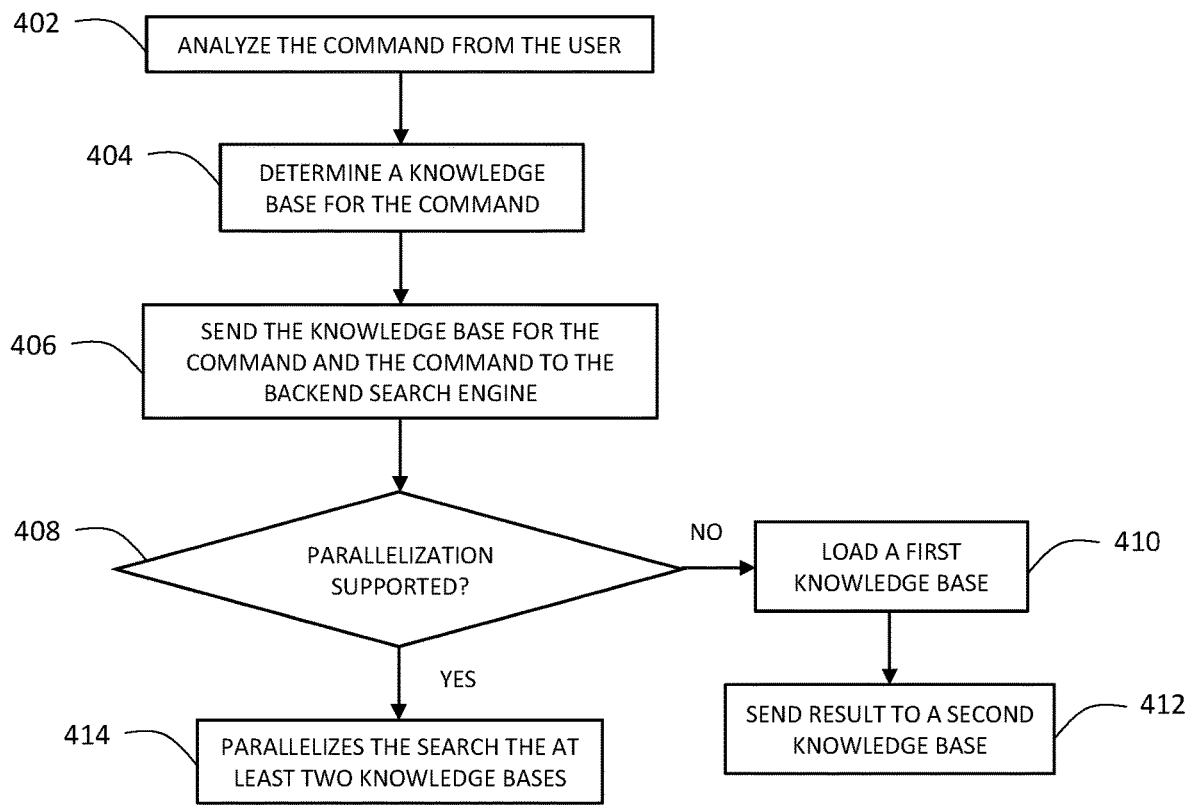
FIG. 4 depicts a flowchart for a curiosity command program determining and managing a knowledge base for performing a search on a command provided by a user, in accordance with an embodiment of the present invention.

FIG. 4 depicts a flowchart for a curiosity command program determining and managing a knowledge base for performing a search on a command provided by a user, in accordance with an embodiment of the present invention.

Curiosity command program 112 analyzes the command from the user (402). Curiosity command program 112 analyzes the performable command from the user to identify various topics as previously discussed with regards to (206) in FIG. 2. Upon identifying the various topics for the performable command, curiosity command program 112 determines an overall topic based on the various topics. In a previously discussed example, the audible speech captured by the electronic device includes, "If we are still going to the baseball game, hopefully it doesn't rain." Curiosity command program 112 identifies the topic as "baseball game" with an association with a particular variable and not a particular recipient. However, upon curiosity command program 112 analyzing the performable command, curiosity command program 112 determines the overall topic is "rain", compared to a previously identified topic of "baseball game". The performable command relates to obtaining a response relating to "rain" and not the "baseball game", as was the previously identified topic of the audible speech by the user.

Curiosity command program 112 determines a knowledge base for the command (404). A knowledge base is utilized to store complex structured and unstructured data relating to various categories, where the AVI can perform a search on one or more knowledge bases associated with the topic of the performable search. Each knowledge base can relate to various categories ranging from technology and science to history and entertainment. Curiosity command program 112 sends the knowledge base for the command and the command to the backend search engine (406). In this embodiment, curiosity command program 112 sends a first knowledge base hint, a second knowledge base hint, and the command to the backend search engine of the IVA.

Curiosity command program 112 determines whether a parallelization for the search is supported (decision 408). In the event curiosity command program 112 determines the parallelization for the search is not support ("no" branch, decision 408), curiosity command program 112 loads a priority knowledge base (410). Curiosity command program 112 loads a first knowledge base (410). Curiosity command program 112 loads the first knowledge base into the backend search engine and curiosity command program 112 receives the results from the backend search engine for the searchable command. Curiosity command program 112 sends result to a second knowledge base (412). Curiosity command program 112 sends the result from the first knowledge base to the second knowledge base.

In the event curiosity command program 112 determines the parallelization for the search is supported ("yes" branch, decision 408), curiosity command program 112 parallelizes the search with the two knowledge bases (414). Curiosity command program 112 parallelizes the search by loading into the first knowledge base and the second knowledge base and receiving a result for the performable command in parallel.

Curiosity command program 112 loads a first knowledge base (410). Curiosity command program 112 loads the first knowledge base into the backend search engine and curiosity command program 112 receives the results from the backend search engine for the searchable command. Curiosity command program 112 sends result to a second knowledge base (412). Curiosity command program 112 sends the result from the first knowledge base to the second knowledge base.

Figure 5:
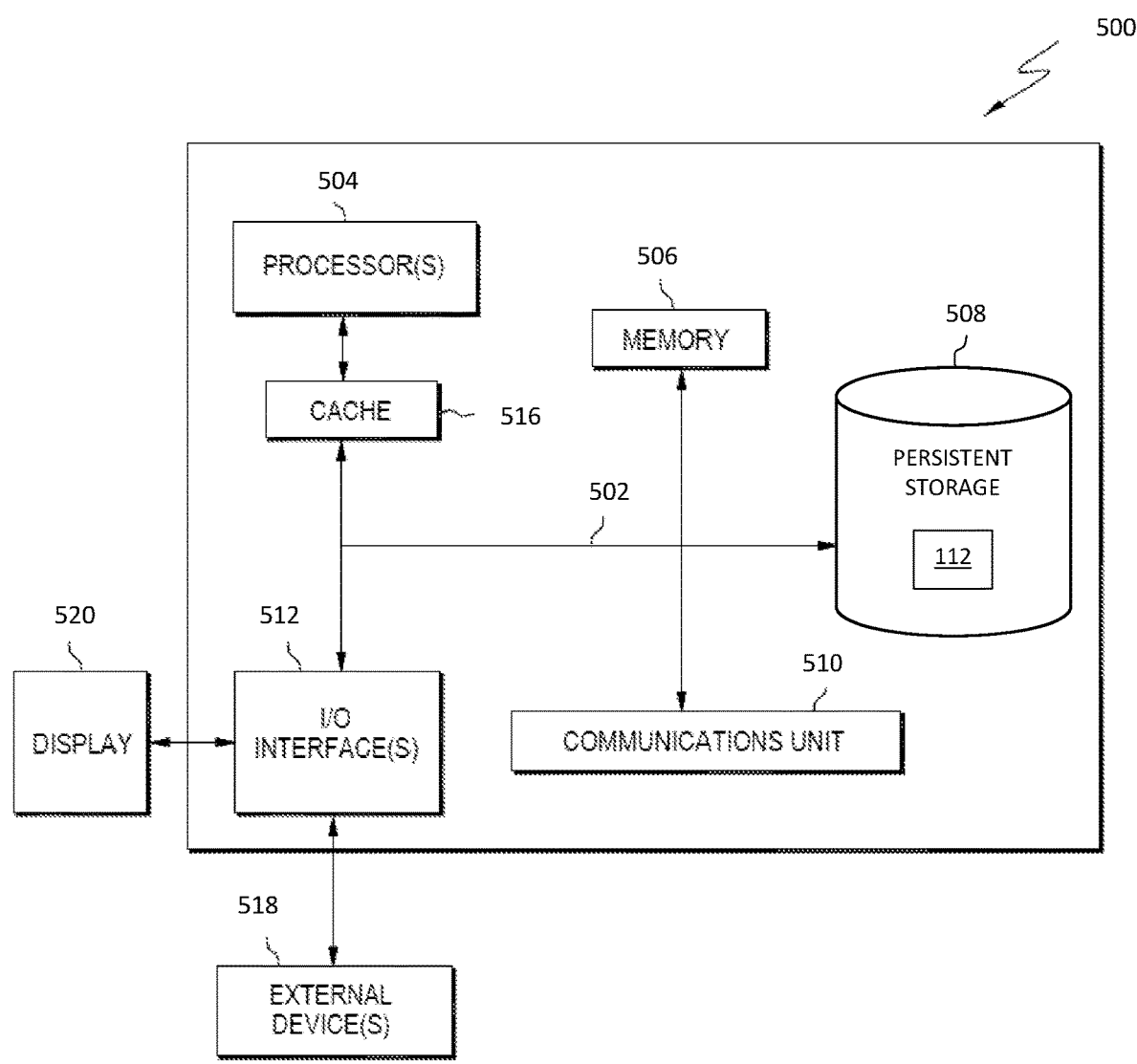
FIG. 5 is a block diagram of components of a computer system, such as the server computer of FIG. 1, in accordance with an embodiment of the present invention.

FIG. 5 depicts computer system 500, where server computer 102 is an example of a computer system 500 that includes curiosity command program 112. The computer system includes processors 504, cache 516, memory 506, persistent storage 508, communications unit 510, input/output (I/O) interface(s) 512 and communications fabric 502. Communications fabric 502 provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of processors 504 by holding recently accessed data, and data near recently accessed data, from memory 506.

Program instructions and data used to practice embodiments of the present invention may be stored in persistent storage 508 and in memory 506 for execution by one or more of the respective processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to each computer system. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
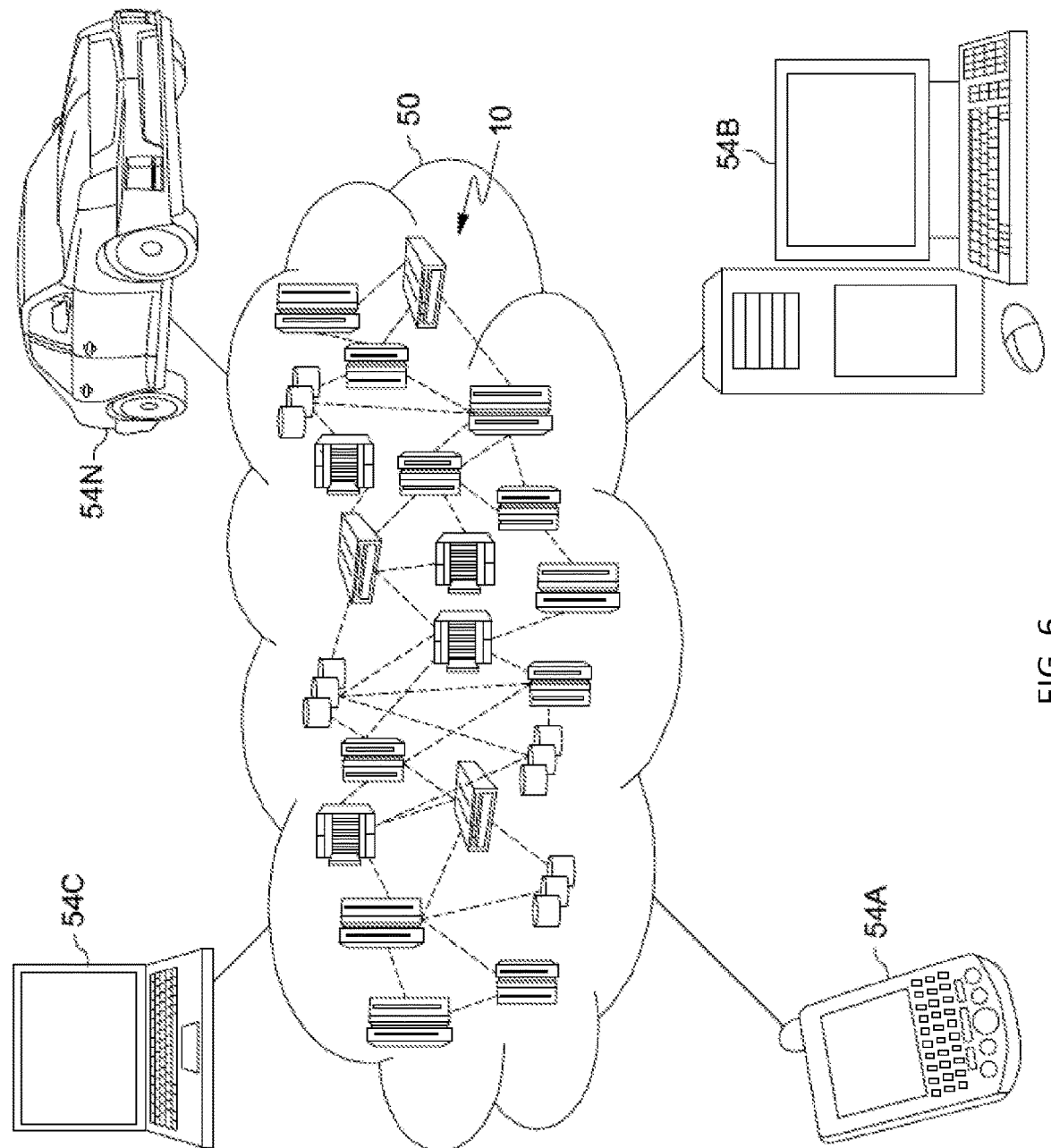
FIG. 6 depicts a cloud computing environment, in accordance with an embodiment of the present invention.
Figure 7:
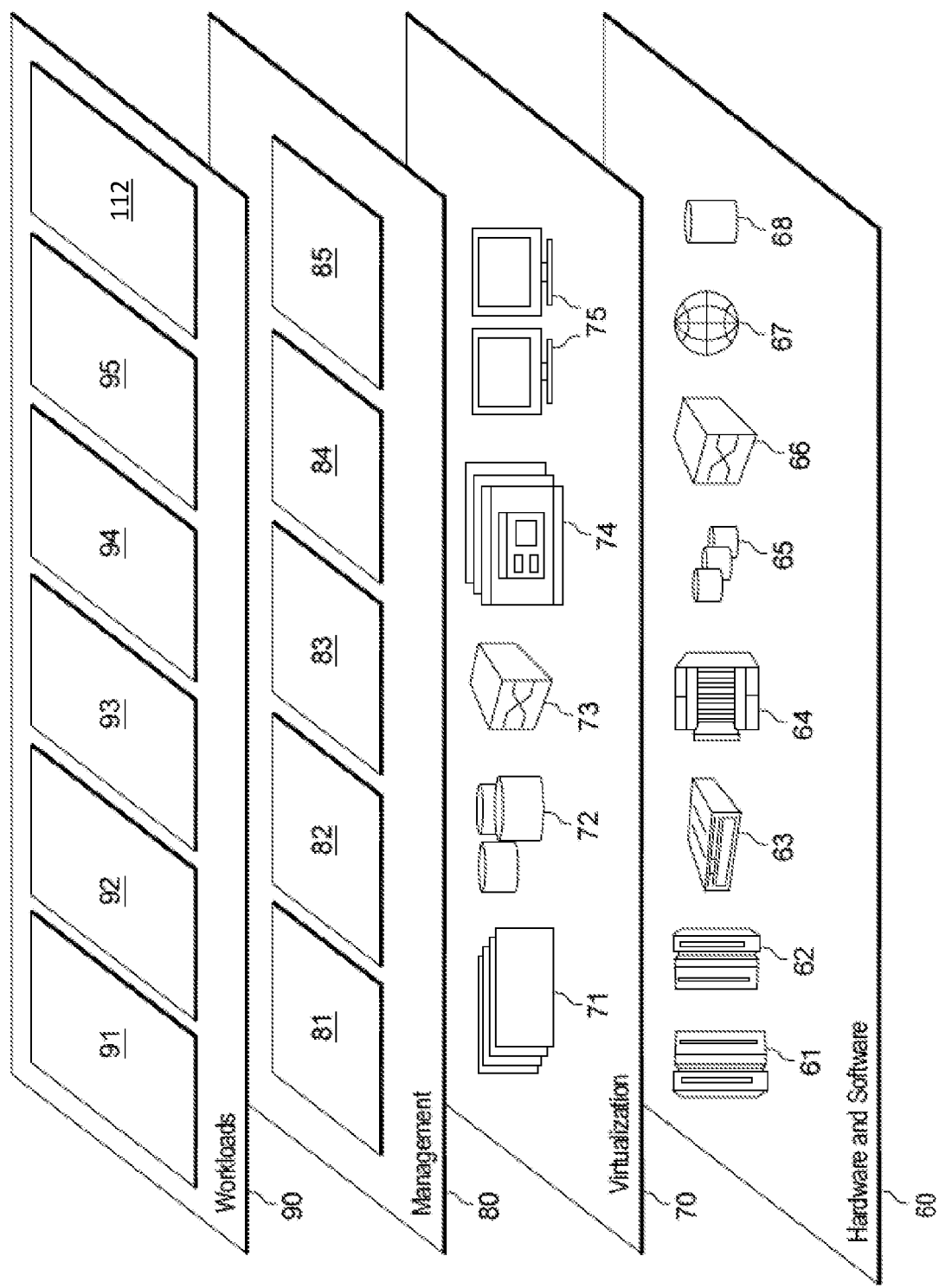
FIG. 7 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and curiosity command program 112.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   determining a curiosity of a user based on data received from an electronic device associated with the user, wherein the data includes audible speech captured from the user and one or more facial expressions of the user;
   determining a grade of curiosity based on the data received from the electronic device associated with the user;
   identifying a first wavelength for the audible speech from the user to initiate a command detection mode based on a plurality of wavelengths associated with a user profile for the user;
   identifying a topic for the audible speech from the user;
   responsive to determining an intelligent virtual assistant is an intended recipient based on the topic, suspending an activation word for the intelligent virtual assistant;

determining a search depth score for a command performable by the intelligent virtual assistant within the audible speech of the user; and responsive to sending the search depth score for the command performable by the intelligent virtual assistant to a backend search engine, providing a response time for executing the command performable by the intelligent virtual assistant to the user based on the search depth score.

2. The computer-implemented method of claim 1, further comprising:

identifying a first set of wavelengths from the plurality of wavelengths associated with the user profile for the user, wherein the first set of wavelengths are associated with a first plurality of questions presented to the intelligent virtual assistant;

performing a wavelength clarification test to identify a second set of wavelengths from the plurality of wavelengths associated with the user, wherein the second set of wavelengths are associated with a second plurality of questions not presented to the intelligent virtual assistant; and establishing the user profile for the user based on the first set of wavelengths and the second set of wavelengths.

3. The computer-implemented method of claim 2, wherein performing the wavelength clarification test further comprises:

sending a plurality of sample questions to the intelligent virtual assistant;

instructing the intelligent virtual assistant to request the user audibly repeat the plurality of sample questions, wherein the plurality of sample questions do not relate to a command performable by the intelligent virtual assistant; and identifying the second set of wavelengths for the plurality of sample questions audibly repeated by the user.

4. The computer-implemented method of claim 1, further comprising:

receiving a modification to the search depth score from the user, wherein a modified search depth score alters the response time for executing the command performable by the intelligent virtual assistant.

5. The computer-implemented method of claim 1, further comprising:

analyzing a command performable by the intelligent virtual assistant within the audible speech of the user;

determining at least two knowledge bases for the command performable by the intelligent virtual assistant, wherein a backend search engine utilizes the at least two knowledge bases to search for a response to the command performable by the intelligent virtual assistant; and responsive to determining parallelization for the at least two knowledge bases are supported, parallelizing the search with the at least two knowledge bases.

6. The computer-implemented method of claim 1, further comprising:

analyzing a command performable by the intelligent virtual assistant within the audible speech of the user;

determining at least two knowledge bases for the command performable by the intelligent virtual assistant, wherein a backend search engine utilizes the at least two knowledge bases to search for a response to the command performable by the intelligent virtual assistant;

responsive to determining parallelization for the at least two knowledge bases is not supported, loading a first knowledge base into the backend search engine; and sending a result from the first knowledge base to a second knowledge base.

7. A computer program product comprising:

one or more computer readable storage media and program instructions stored on the one or more computer readable storage media, the program instructions comprising:

program instructions to determine a curiosity of a user based on data received from an electronic device associated with the user, wherein the data includes audible speech captured from the user and one or more facial expressions of the user;

program instructions to determine a grade of curiosity based on the data received from the electronic device associated with the user;

program instructions to identify a first wavelength for the audible speech from the user to initiate a command detection mode based on a plurality of wavelengths associated with a user profile for the user;

program instructions to identify a topic for the audible speech from the user;

program instructions to, responsive to determining an intelligent virtual assistant is an intended recipient based on the topic, suspend an activation word for the intelligent virtual assistant;

program instructions to determine a search depth score for a command performable by the intelligent virtual assistant within the audible speech of the user; and program instructions to, responsive to sending the search depth score for the command performable by the intelligent virtual assistant to a backend search engine, provide a response time for executing the command performable by the intelligent virtual assistant to the user based on the search depth score.

8. The computer program product of claim 7, wherein the program instructions stored on the one or more computer readable storage media further comprise:

program instructions to identify a first set of wavelengths from the plurality of wavelengths associated with the user profile for the user, wherein the first set of wavelengths are associated with a first plurality of questions presented to the intelligent virtual assistant;

program instructions to perform a wavelength clarification test to identify a second set of wavelengths from the plurality of wavelengths associated with the user, wherein the second set of wavelengths are associated with a second plurality of questions not presented to the intelligent virtual assistant; and program instructions to establish the user profile for the user based on the first set of wavelengths and the second set of wavelengths.

9. The computer program product of claim 8, wherein the program instructions to perform the wavelength clarification test comprises:

program instructions to send a plurality of sample questions to the intelligent virtual assistant;

program instructions to instruct the intelligent virtual assistant to request the user audibly repeat the plurality of sample questions, wherein the plurality of sample questions do not relate to a command performable by the intelligent virtual assistant; and program instructions to identify the second set of wavelengths for the plurality of sample questions audibly repeated by the user.

10. The computer program product of claim 7, wherein the program instructions stored on the one or more computer readable storage media further comprise:
program instructions to receive a modification to the search depth score from the user, wherein a modified search depth score alters the response time for executing the command performable by the intelligent virtual assistant.

11. The computer program product of claim 7, wherein the program instructions stored on the one or more computer readable storage media further comprise:
program instructions to analyze a command performable by the intelligent virtual assistant within the audible speech of the user;
program instructions to determine at least two knowledge bases for the command performable by the intelligent virtual assistant, wherein a backend search engine utilizes the at least two knowledge bases to search for a response to the command performable by the intelligent virtual assistant; and
program instructions to, responsive to determining parallelization for the at least two knowledge bases are supported, parallelize the search with the at least two knowledge bases.

12. The computer program product of claim 7, wherein the program instructions stored on the one or more computer readable storage media further comprise:
program instructions to analyze a command performable by the intelligent virtual assistant within the audible speech of the user;
program instructions to determine at least two knowledge bases for the command performable by the intelligent virtual assistant, wherein a backend search engine utilizes the at least two knowledge bases to search for a response to the command performable by the intelligent virtual assistant;
program instructions to, responsive to determining parallelization for the at least two knowledge bases is not supported, load a first knowledge base into the backend search engine; and
program instructions to send a result from the first knowledge base to a second knowledge base.

13. A computer system comprising:
one or more computer processors;
one or more computer readable storage media; and
program instructions stored on the one or more computer readable storage media for execution by at least one of the one or more computer processors, the program instructions comprising:
one or more computer readable storage media and program instructions stored on the one or more computer readable storage media, the program instructions comprising:
program instructions to determine a curiosity of a user based on data received from an electronic device associated with the user, wherein the data includes audible speech captured from the user and one or more facial expressions of the user;
program instructions to determine a grade of curiosity based on the data received from the electronic device associated with the user;
program instructions to identify a first wavelength for the audible speech from the user to initiate a command detection mode based on a plurality of wavelengths associated with a user profile for the user;
program instructions to identify a topic for the audible speech from the user;
program instructions to, responsive to determining an intelligent virtual assistant is an intended recipient based on the topic, suspend an activation word for the intelligent virtual assistant;
program instructions to determine a search depth score for a command performable by the intelligent virtual assistant within the audible speech of the user; and
program instructions to, responsive to sending the search depth score for the command performable by the intelligent virtual assistant to a backend search engine, provide a response time for executing the command performable by the intelligent virtual assistant to the user based on the search depth score.

14. The computer system of claim 13, wherein the program instructions stored on the one or more computer readable storage media further comprise:
program instructions to identify a first set of wavelengths from the plurality of wavelengths associated with the user profile for the user, wherein the first set of wavelengths are associated with a first plurality of questions presented to the intelligent virtual assistant;
program instructions to perform a wavelength clarification test to identify a second set of wavelengths from the plurality of wavelengths associated with the user, wherein the second set of wavelengths are associated with a second plurality of questions not presented to the intelligent virtual assistant; and
program instructions to establish the user profile for the user based on the first set of wavelengths and the second set of wavelengths.

15. The computer system of claim 14, wherein the program instructions to perform the wavelength clarification test comprises:
program instructions to send a plurality of sample questions to the intelligent virtual assistant;
program instructions to instruct the intelligent virtual assistant to request the user audibly repeat the plurality of sample questions, wherein the plurality of sample questions do not relate to a command performable by the intelligent virtual assistant; and
program instructions to identify the second set of wavelengths for the plurality of sample questions audibly repeated by the user.

16. The computer system of claim 13, wherein the program instructions stored on the one or more computer readable storage media further comprise:
program instructions to receive a modification to the search depth score from the user, wherein a modified search depth score alters the response time for executing the command performable by the intelligent virtual assistant.

17. The computer system of claim 13, wherein the program instructions stored on the one or more computer readable storage media further comprise:
program instructions to analyze a command performable by the intelligent virtual assistant within the audible speech of the user;
program instructions to determine at least two knowledge bases for the command performable by the intelligent virtual assistant, wherein a backend search engine utilizes the at least two knowledge bases to search for a response to the command performable by the intelligent virtual assistant;
program instructions to, responsive to determining parallelization for the at least two knowledge bases is not supported, load a first knowledge base into the backend search engine; and program instructions to send a result from the first knowledge base to a second knowledge base.

18. The computer system of claim 13, wherein the program instructions stored on the one or more computer readable storage media further comprise:
program instructions to analyze a command performable by the intelligent virtual assistant within the audible speech of the user;
program instructions to determine at least two knowledge bases for the command performable by the intelligent virtual assistant, wherein a backend search engine utilizes the at least two knowledge bases to search for a response to the command performable by the intelligent virtual assistant; and
program instructions to, responsive to determining parallelization for the at least two knowledge bases are supported, parallelize the search with the at least two knowledge bases.

\* \* \* \* \*